No. 814,071. PATENTED MAR. 6, 1906.
L. NISSIM.
SPEED INDICATING APPARATUS.
APPLICATION FILED NOV. 7, 1904.

5 SHEETS—SHEET 1.

Witnesses
Edwin D. Bartlett

Inventor
Louis Nissim
per Herbert Lefton Jones
Attorney

No. 814,071. PATENTED MAR. 6, 1906.
L. NISSIM.
SPEED INDICATING APPARATUS.
APPLICATION FILED NOV. 7, 1904.

5 SHEETS—SHEET 2.

Witnesses
Edwin D. Bartlett
Albert Keule

Inventor
Louis Nissim
per Herbert Jefton Jones
Attorney

No. 814,071. PATENTED MAR. 6, 1906.
L. NISSIM.
SPEED INDICATING APPARATUS.
APPLICATION FILED NOV. 7, 1904.
5 SHEETS—SHEET 3.
*Fig:4.ª*
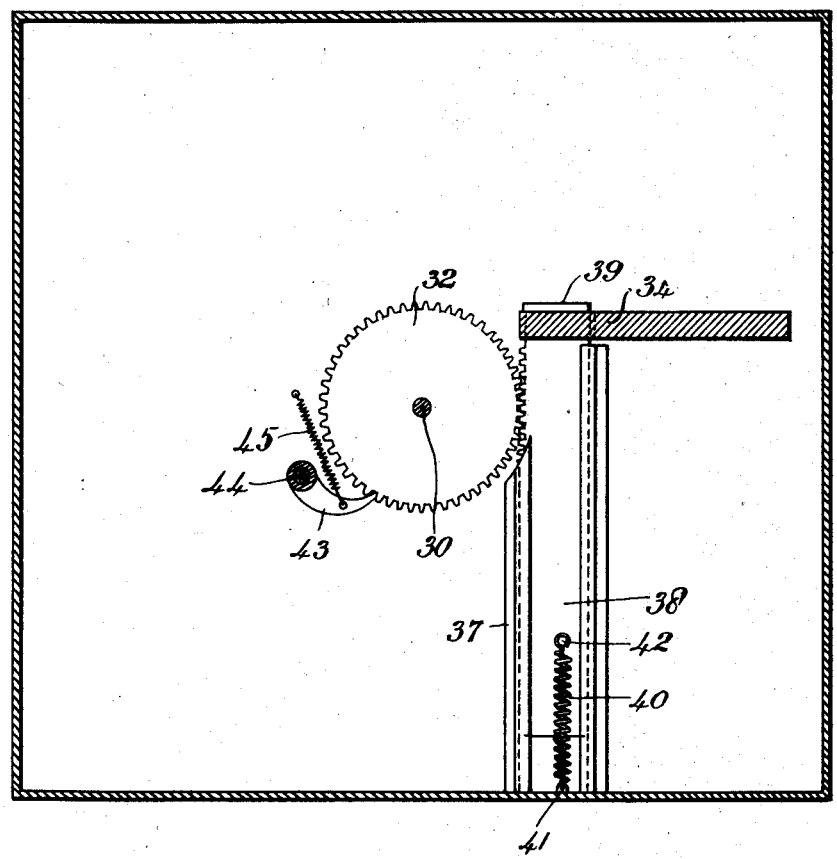

No. 814,071. PATENTED MAR. 6, 1906.
L. NISSIM.
SPEED INDICATING APPARATUS.
APPLICATION FILED NOV. 7, 1904.
5 SHEETS—SHEET 4.
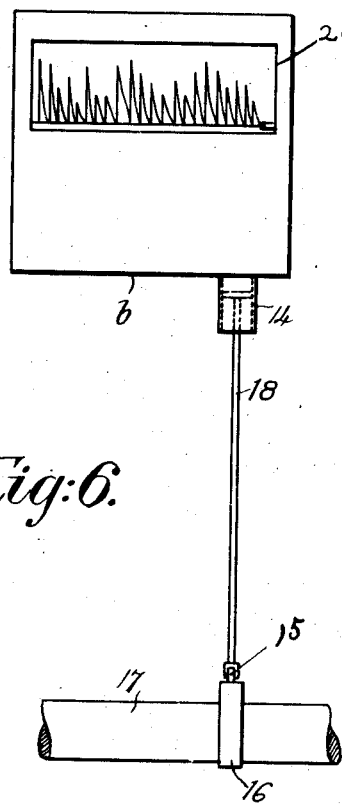
Fig: 6.
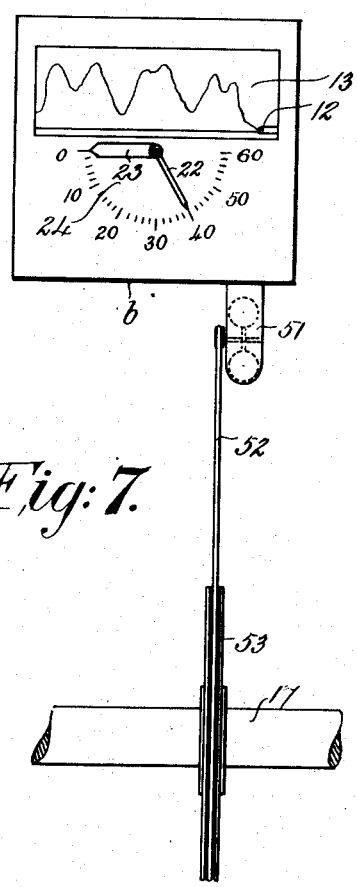
Fig: 7.
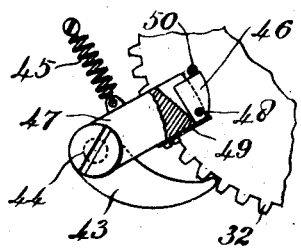
Fig: 5.
Witnesses
Edwin D. Bartlett
Inventor
Louis Nissim
per Herbert Sefton Jones
Attorney No. 814,071. PATENTED MAR. 6, 1906.
L. NISSIM.
SPEED INDICATING APPARATUS.
APPLICATION FILED NOV. 7, 1904.

5 SHEETS—SHEET 5.

Witnesses
Edwin D. Bartlett
[signature]

Inventor
Louis Nissim
per Herbert Sefton Jones
Attorney

UNITED STATES PATENT OFFICE.

LOUIS NISSIM, OF SOUTHEND-ON-SEA, ENGLAND.

SPEED-INDICATING APPARATUS.

No. 814,071.  Specification of Letters Patent.  Patented March 6, 1906.

Application filed November 7, 1904. Serial No. 231,755.

*To all whom it may concern:*

Be it known that I, LOUIS NISSIM, mechanician, a subject of the King of Great Britain, residing at 88 Baxter avenue, Southend-on-Sea, in the county of Essex, England, have invented new and useful Improvements in Speed-Indicating Apparatus, of which the following is a specification.

This invention has for its object a speed-indicating and recording device wherein a suitable air-compressing apparatus is driven from a moving part of the vehicle or the like whose speed is to be determined, and the compressed air operating in a cylinder having an escapement-opening causes to move outward to a greater or less extent a piston which controls said escapement-opening, according to the amount of the air supplied, whereby through a suitable device the desired indication is given.

The instrument is applicable for indicating and recording the speeds of cars, cycles, motor-vehicles, trains, &c.

Figure 1:
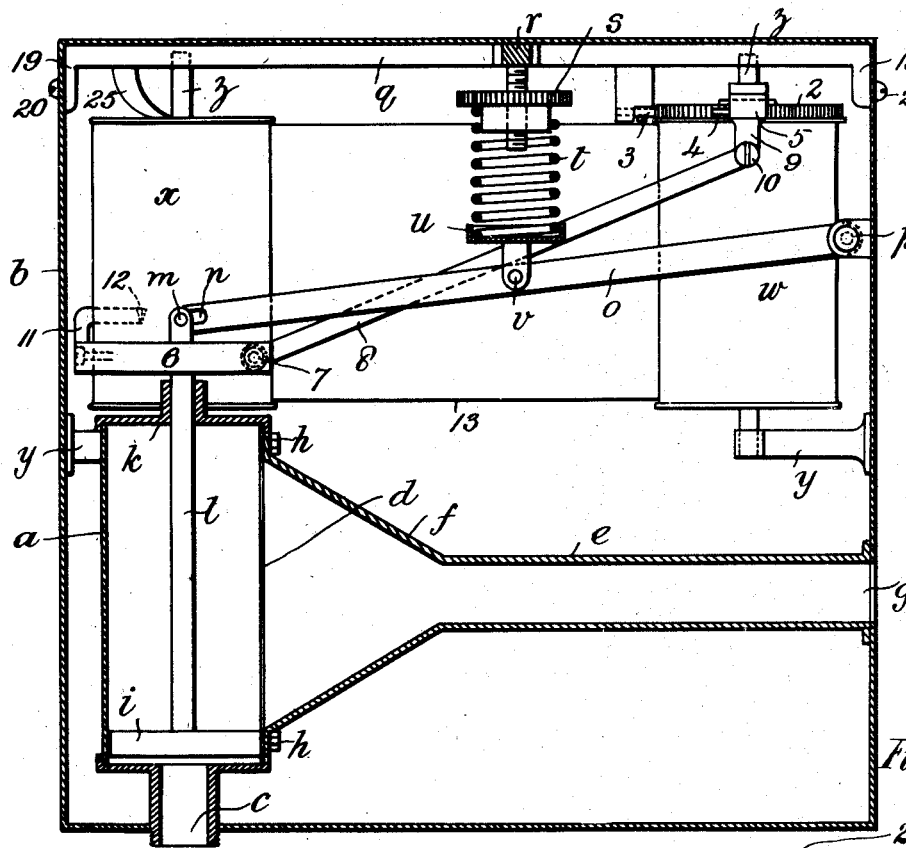
Figure 2:
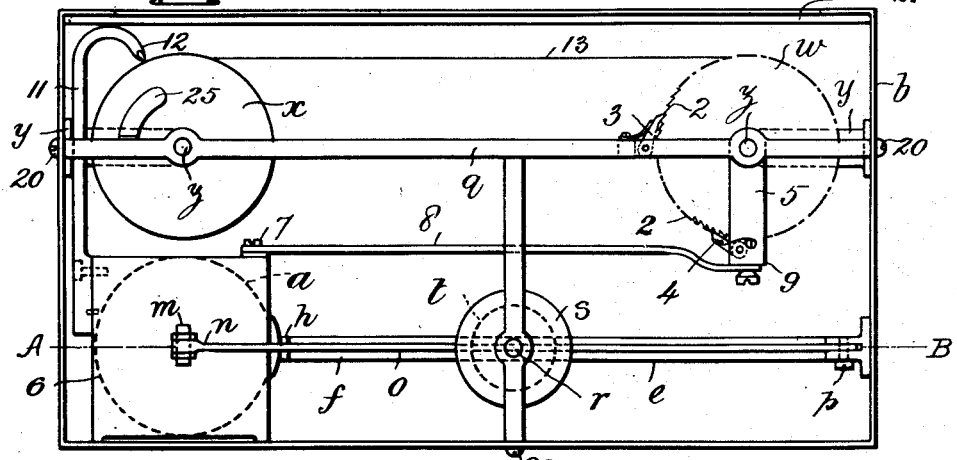
Figure 3:
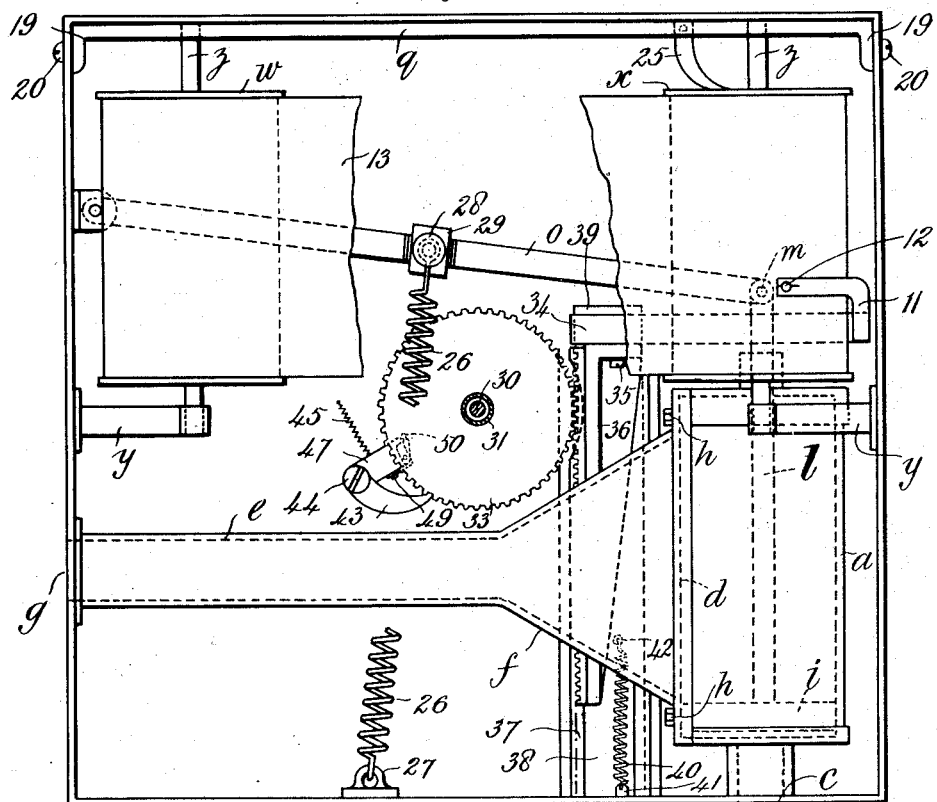
Figure 4:
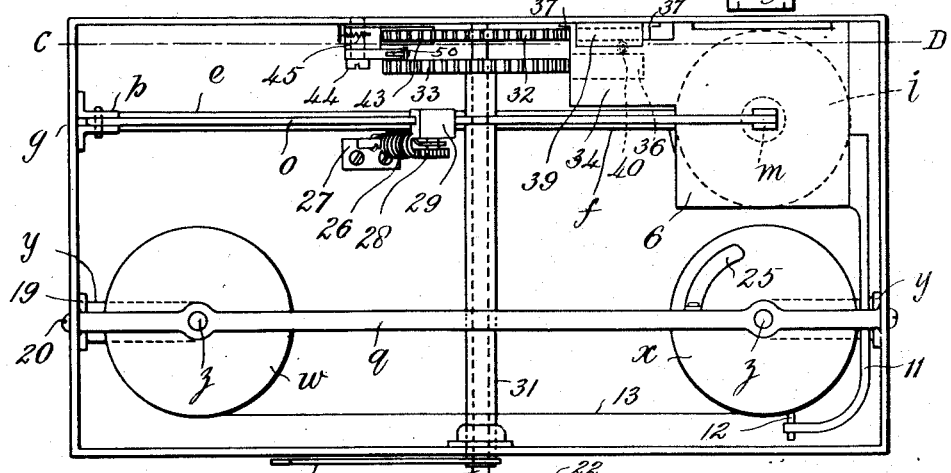
Figure 8:
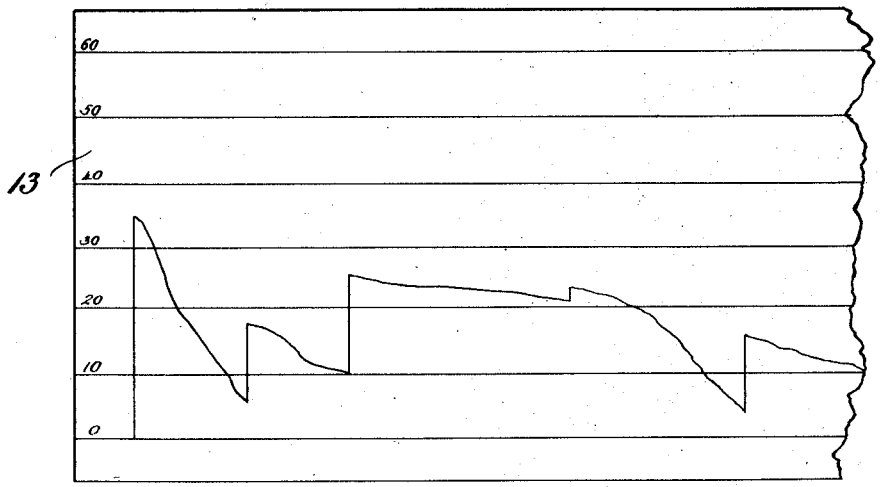

In the accompanying drawings, Figure 1 is a sectional elevation of one form of the apparatus, taken on the line A B of Fig. 2. Fig. 2 is a plan view of said apparatus with the cover removed. Fig. 3 is an elevation of a modified form of apparatus with the front removed. Fig. 4 is a plan view of the apparatus shown in Fig. 3, but with the cover removed. Fig. 4ª shows a sectional elevation taken on the line C D of Fig. 4. Fig. 5 shows, to a larger scale, a detail of the apparatus illustrated in Figs. 3 and 4. Figs. 6 and 7, respectively, are diagrammatic illustrations of the manner in which the two forms of apparatus above indicated may be used. Fig. 8 shows a portion of a record-strip.

Suitable means of any known kind driven by a moving part of the vehicle or the like whose speed is to be measured may be employed for compressing air. In the drawings, Fig. 6, I have shown diagrammatically a double-acting air-pump 14, driven from a shaft, vehicle-axle, or the like 17, as described hereinafter, said air-pump supplying to the apparatus air in greater or less amount, according to the speed of the vehicle.

Any known equivalents may be substituted for the pump and driving means so long as the condition above mentioned as to the supply of air is fulfilled. For instance, in Fig. 7 a centrifugal air-compressor is shown supplying the apparatus. Assuming, then, a supply of air proportional to the speed of the vehicle under consideration, the essential parts of the recording apparatus shown in Figs. 1 and 2 are as follows: $a$ is a cylinder fixed in a suitable casing $b$, said cylinder having an inlet $c$ at the bottom for the compressed air. At one side of the cylinder is a vertical slit $d$ of perhaps one-hundredth of an inch breadth discharging into the flattened funnel-shaped end $f$ of an exhaust-pipe $e$, the mouth of which opens outside the casing at $g$. The funnel $f$ is connected to the cylinder in a removable manner by nuts $h$ or the like. In the cylinder $a$ is a piston $i$, which, while fitting as closely as possible, must be arranged to work freely. The piston-rod $l$ is guided in a cap $k$ and engages by a pin $m$ in the slot $n$ of a rod $o$, hinged to the opposite side of the casing at $p$. At the top of the casing is a frame $q$, held in place, for instance, by lugs 19 and screws 20. From one arm of this frame projects downwardly a stud $r$. On this stud works an adjusting-nut $s$, forming an abutment for a coiled spring $t$, while the lower end of said spring rests in a cup $u$, connected to the rod $o$ at $v$.

Two paper-carrying drums $w$ $x$ are supported in the casing, for instance, by brackets $y$ at the bottom and by pins $z$ at the top engaging in the frame $q$. In the arrangement shown the drum $w$ has at the top a ratchet-wheel 2, engaged, on the one hand, by a spring-held stop-pawl 3, mounted on the frame $q$, and, on the other hand, by a spring-held driving-pawl 4, mounted on an arm 5, which is pivoted about the stem $z$. The piston-rod $l$ has a head 6 formed square in the example shown in order that it may act as a guide against the walls of the casing $b$, and to said head is hinged at a suitable point 7 a link 8, connected at the other end by a pin 10 to a downwardly-projecting lug 9 on the arm 5. From the head 6 also projects an arm 11, suitably supporting a pencil or recording-point 12 at its end. The arm 11 may be made of springy material in order that the point may rest with suitable pressure against the paper on the drum $x$. A spring-tongue 25, attached to the cross-piece $q$ and bearing on the end of drum $x$, acts as a brake to keep the paper strip 13 tight between the drums $w$ $x$. With this arrangement when air under pressure from a pump or the like, driven from a moving part of the vehicle, enters the cylinder $a$ at the end $c$ it causes the piston $i$ to rise more or less according to the amount of air supplied, and consequently according to the travel necessary to open a sufficient length of the slit $d$ to allow all of said air to escape as it is supplied.

The strip of paper 13 is marked by the pencil 12 as the piston rises and falls, and the paper is fed forward in the example shown only at the times when the piston falls by the engagement of the pawl 4 in the ratchet-wheel 2, while when the piston rises the arm 5 is moved backward, the pawl 4 slipping over the teeth of the ratchet-wheel, which is held stationary by the pawl 3. With this construction changes of speed only are recorded, the paper remaining stationary as long as the speed does not appreciably alter and also as long as the speed is steadily rising, only being moved forward when the speed falls off again so that the piston may descend. This mechanism, however, might be replaced, as explained below, by any known form of clockwork mechanism which will continuously move forward the paper band, so as to indicate not only the speed changes, but the times in which they take place.

Fig. 6 shows diagrammatically how the above-described apparatus may be arranged for use. The casing $b$ inclosing the apparatus will have a window 21 at one side through which the surface of the strip 13 can be seen, and owing to the fact that the indications are marked as the band comes off one drum $x$ all the records for some time past will be visible at the opening, as is indicated. The possible outline of the indications marked on the sheet is seen in the figure through the window 21.

The air-compressing device, preferably a double-acting air-pump 14, may be mounted on the bottom of the casing $b$ and its piston may be connected by rods, links, &c., in any convenient way to a roller 15, for example, working on cam 16, which may be fixed on the axle 17, wheel, or any other convenient part of the vehicle. As this part rotates the cam will cause the roller 15 to rise and fall, thereby raising and lowering the piston-rod 18 of the air-pump 14 and causing an approximately continuous supply of air under pressure to be fed to the cylinder of the recording apparatus. This arrangement, as before mentioned, is only indicated by way of example.

The strip of paper 13 may be ruled horizontally, as seen in Fig. 8, with lines representing in their distance apart speeds in miles per hour or any other units, and when the apparatus is applied to any vehicle the tension of the spring $t$ should be first adjusted so that the apparatus will record correctly for that vehicle. The apparatus might, however, be calibrated apart from the vehicle, and instructions might be supplied giving the position which the spring-tension-regulating screw should occupy for working on a certain sized cam on the axle of the vehicle with a particular size of wheel.

A modified form of apparatus is shown in Figs. 3, 4, 5, and 7, wherein the paper band is moved forward continuously by clockwork, while a pair of hands is employed working over a dial, the one hand to register the maximum speed since the journey was started, while the other indicates the speed at any particular moment. As compared with Fig. 1, Fig. 3 illustrates the apparatus as seen from the other side in order to show more clearly some of the parts. The front of the casing with the dial-hands and dial is removed and the paper band 13 is partly broken away. The cylinder $a$ with its piston, air-escapement pipe, and certain other parts remain the same as in the first-described construction. They are therefore given the same letters as before and require no further explanation. The rod 8 with the pawl mechanism operated thereby for turning the drum $w$ are omitted, and the drum in this case contains a clockwork of any suitable form whereby it may be continuously and slowly moved forward. Clockwork-drums of this character are well known. The spring arrangement $r\ s\ t\ u\ v$, Figs. 1 and 2, is now replaced by a spring 26, connected to a lug 27 on the base and to the screw 28 of a block 29, which is adapted to slide along the arm $o$ and to be set in any required position thereon by the screw 28. According as the block 29 is nearer to or farther from the end of the rod $o$, which engages with the pin $m$ on the top of piston-rod $l$, the spring 26 resists with greater or less force the rising of the piston in cylinder $a$, and a means of adjustment and calibration is thus provided equivalent to that provided by the arrangement $r\ s\ t\ u\ v$, Figs. 1 and 2.

The apparatus has a dial. In the example shown it is a semicircular dial 24, Fig. 7, with two hands 22 23. The hand 22 is mounted on spindle 30, which passes through the casing and carries at the rear a pinion 32, while hand 23 is mounted on a sleeve 31, surrounding spindle 30 and carrying a corresponding pinion 33. The head 6 of piston-rod $l$ is in this case provided with an extension 34, to which is attached by screws 35, for example, a bracket-piece 36, formed as a rack on its front edge, as seen in Fig. 3. The said rack engages with the pinion 33. A second rack formed on a plate 38 is mounted in a guide 37 on the rear wall of the casing, as seen in Fig. 4ᵃ. It engages with pinion 32, and its head 39 projects over the top of the extension-plate 34, while a spring 40, connected to the base at 41 and to the rack-plate at 42, tends to pull said plate to its lowest position. A pawl 43, pivoted on a pin 44, engages with the pinion 32, as seen more clearly in Fig. 5. Said pawl is pulled into engagement with the pinion by a spring 45. A trip 46, pivoted at 48 in a slot in the tailpiece 47 of pawl 43, has a squared end against which presses a spring 49, normally holding the trip in the position shown. A pin 50, projecting from the pinion 33, is adapted to press back and pass the trip 46 when moving it in one direction and to press it downward, together with the tailpiece 47, when said pinion 33 moves round again in the opposite direction, thereby releasing the pawl 43 from its pinion 32.

This apparatus operates as follows: As the piston in cylinder $a$ rises and falls, according to the speed of the vehicle and the consequent amount of air supplied, the rack 36 rises and falls, turning with it pinion 33 and the hand 23. This hand, therefore, always shows on the dial 24 (when the apparatus is properly calibrated) what is the speed at every moment. The rack 38 is raised by the engagement of plate 34 with its head 39, turning its pinion 32 with hand 22. Said rack is, however, prevented from returning with the plate 34 and piston $i$ when the speed falls, owing to the action of pawl 43. Hence when the apparatus is in working the hand 22 always registers the maximum speed since the start, and said hand remains in the same position when the apparatus stops working. Immediately, however, that a fresh start is made, the piston $i$ being at the bottom of its cylinder because no air-pressure exists below said piston and the pinion 33, operated from said piston by rack 36, being therefore in such position that the pin 50 is behind the trip 46, said pin 50 as the pinion 33 is turned engages the trip, releasing the pawl from pinion 32, and so allowing the pinion, with the hand 22 and rack 38, to move back under the action of spring 40, whereupon the hand 22 is ready for registering the maximum speed in the new journey.

Fig. 7 shows the apparatus of Figs. 3 and 4 in operation. In this case a variation in the air-supplying apparatus is shown by way of example: A centrifugal air-blower 51 of known form is fixed below the casing $b$ and driven by a belt 52 from a pulley 53, fixed on the shaft 17. The effect is of course the same as in the first-described form of apparatus. The hands 22 23 indicate the speeds, as before described, while a permanent record is marked by the pencil 12 on the paper band 13. The form of the markings on this band is different from the form shown in Fig. 6 on account of the different method of driving the drum $w$.

The apparatus might be modified by omitting the recording band and drums, if preferred, relying upon the hands and dial alone for the indications given. Of course if pinions 32 and 33 were made smaller the hands could be made to turn through a greater angle for a given movement of the racks 36 38. Any of the parts of the apparatus may be replaced by their mechanical or known equivalents without departing from the scope of the invention.

What I claim is—

1. In speed-indicating apparatus, the combination of a cylinder having a narrow slit in its wall, a piston adapted to work in said cylinder and to expose more or less of said slit according to the position of the piston in the cylinder, a piston-rod and means for guiding the same, a device including a spring and means for adjusting the tension of the same external to the cylinder aforesaid, means operatively connecting said spring device to the piston-rod of said cylinder, an indicating device, means connected to the piston-rod beyond the end of the cylinder for operating said device, an air-compressing apparatus in connection with the cylinder, and means for operating the air-compressing apparatus from a moving part of the vehicle whose speed is to be measured.

2. A speed-indicator comprising an apparatus for supplying air under pressure adapted to be driven from a moving part of the vehicle whose speed is to be measured, a receiving-chamber for said air under pressure said chamber having an outlet, means applied to said cylinder adapted to open or close the air-outlet more or less according to the amount of the air supplied, a dial, a hand adapted to move over said dial, means adapted to move said hand as the air-outlet is opened more or less, a second hand, means adapted to move said second hand in one direction only during the time that the air-outlet is being opened or its opening increased, means tending to move the second hand in the other direction, a catch adapted normally to prevent the return of said second hand and a trip device adapted to release said catch after the first indicating-hand has returned to a zero position and has begun to move forward again.

3. In speed-indicating apparatus the combination of a cylinder having a narrow slit in its wall, a piston adapted to work in said cylinder and to expose more or less of said slit according to its position in the cylinder, means tending to return the piston to the base of the cylinder, a dial, a hand adapted to move over said dial, means connected to the piston adapted to move said hand as the piston moves, a second hand, means adapted to move said second hand in one direction only when the piston moves in one direction, a catch adapted normally to prevent the return of said second hand, a trip device adapted to release said catch after the first indicating-hand has returned to a zero position and has begun to move forward again, means tending to return said second hand to the zero position, an air-compressing apparatus in connection with said cylinder, and means for operating said air-compressing apparatus from a moving part of the vehicle whose speed is to be measured.

4. A speed-indicator comprising an apparatus for supplying air under pressure adapted to be driven from a moving part of the vehicle whose speed is to be measured, a receiving-chamber for said air under pressure said chamber having an air-outlet, a piston in said cylinder adapted to move outward or inward and to open the air-outlet more or less according as the amount of air supplied to the cylinder increases or decreases, a dial, two hands adapted to move over said dial, two pinions each connected to one of said hands, a rack engaging with one pinion and connected to the piston, a second rack engaging with the second pinion, means for guiding the same, means for moving said second rack only when the piston is making a movement in the outward direction, means tending to return the second rack to its starting position, a catch adapted normally to prevent the return of said second rack, and a trip device adapted to release said catch after the piston has returned to its starting position and has begun to move outward again.

In testimony whereof I have signed my name to this specification in the presence of two subscribing witnesses.

LOUIS NISSIM.

Witnesses:
  HUBERT A. GILL,
  LEONARD E. HAYNES.